United States Patent [19]

Kindermann

[11] Patent Number: 4,557,495
[45] Date of Patent: Dec. 10, 1985

[54] SAIL RIG FOR BICYCLE

[76] Inventor: Peter Kindermann, Durch die Aue 1c, 4330 Mülheim, Fed. Rep. of Germany

[21] Appl. No.: 622,699

[22] Filed: Jun. 20, 1984

[30] Foreign Application Priority Data

Jun. 20, 1983 [DE] Fed. Rep. of Germany ....... 3322498

[51] Int. Cl.⁴ ............................................. B62B 15/00
[52] U.S. Cl. .................................................. 280/213
[58] Field of Search ................... 280/213, 289 R, 810, 280/16; 180/2.2, 7.4; 114/102, 103, 39, 39.2

[56] References Cited

U.S. PATENT DOCUMENTS 3,572,740 3/1971 Rypinski ............................... 280/16
3,836,176 9/1974 Ylvisaker .............................. 280/213
3,986,722 10/1976 Patterson .............................. 280/16

FOREIGN PATENT DOCUMENTS 2416828 10/1979 France ................................ 280/213

Primary Examiner—Joseph F. Peters, Jr.
Assistant Examiner—Everett G. Diederiks, Jr.
Attorney, Agent, or Firm—Karl F. Ross; Herbert Dubno

[57] ABSTRACT

A sail rig is used on a standard bicycle having a frame, a saddle on the frame, a front wheel on the frame forward of the saddle, and handlebars on the frame forward of the saddle and connected to the front wheel for pivoting same and steering the bicycle. The sail rig has a sail frame formed of an upright yard having a center and upper and lower ends and a boom extending generally horizontally rearward from the center and having a rear end spaced horizontally therebehind. An upright sail spanned over the yard and boom is generally symmetrical to either side of the boom. A fitting secured to the bicycle frame between the saddle and handlebars forms a socket between the saddle and the handlebars and a holddown eye forward of the handlebars. An upright rigid mast secured in the socket has an upper end connected by a swivel joint with the sail frame generally at the yard center. A halyard having upper and lower ends secured to the respective upper and lower ends of the yard is secured between these ends below the boom to the bicycle frame at the holddown eye. Thus the sail can pivot about an axis through the pivot and the holddown eye. A sheet extends from the boom rearward of the swivel joint to a rider on the saddle.

11 Claims, 9 Drawing Figures

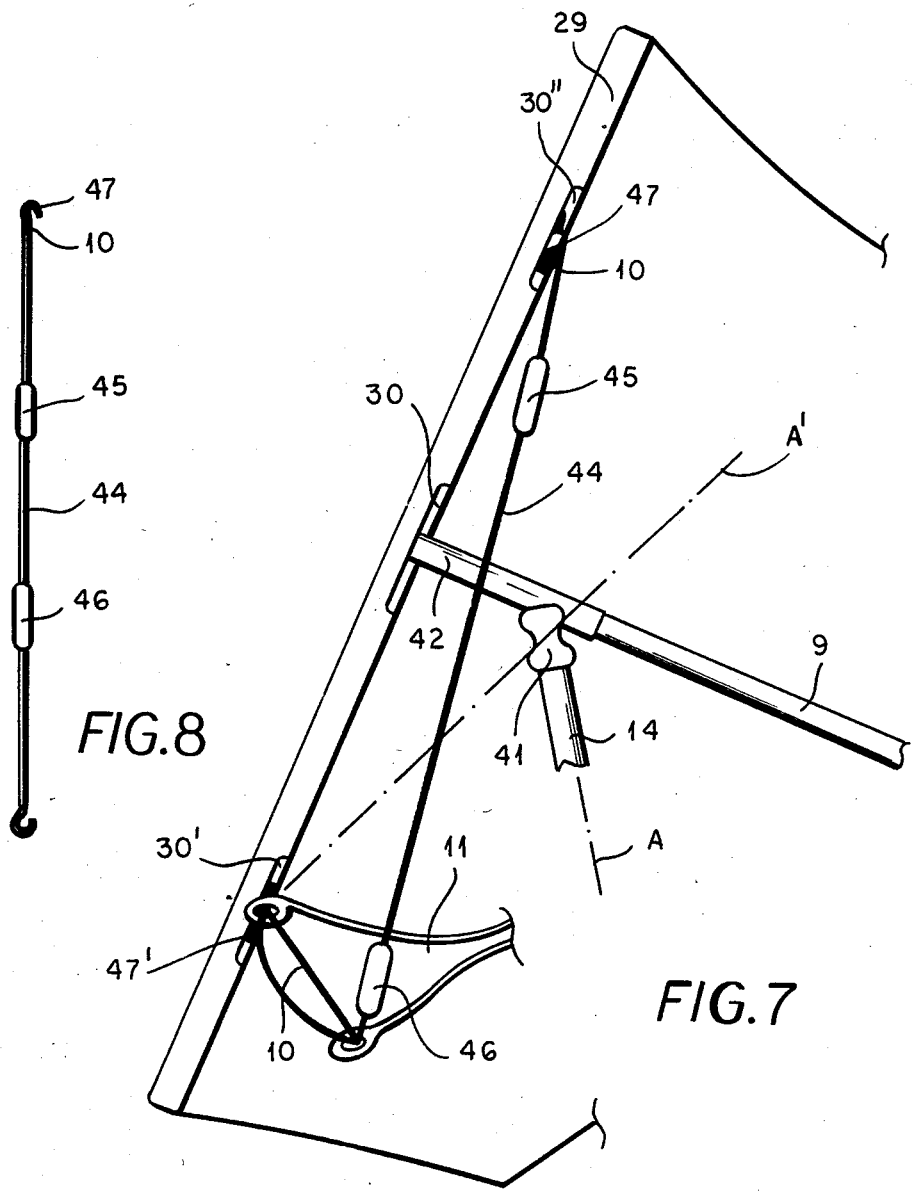

SAIL RIG FOR BICYCLE

FIELD OF THE INVENTION

The present invention relates to a sail rig for a bicycle.

BACKGROUND OF THE INVENTION

It has been suggested as early as 1893 in German Pat. No. 75,773 to provide a sail on a bicycle. A rig is provided that allows the sail to be attached in front of the rider, spinnaker-fashion, to catch a following wind and propel the bicycle. Such arrangments, as described in relatively recent U.S. Pat. No. 3,836,176 therefore allow the bicycle to run only, that is to move before the wind. It is impossible to reach, that is sail with the wind abeam, at all in such arrangements and beating, that is changing tack, is impossible.

Another solution using a sort of sloop rig is proposed in U.S. Pat. No. 3,986,722. This arrangement puts the center of effort above the head of the rider of the bicycle, and requires the rider to hold onto the boom in order to control the sail. Sailing with such an arrangement requires that the rider, while holding the boom with one hand and the handlebars with another, heel the entire vehicle into the wind to compensate for the high center of effort. Any change in wind requires split-second reactions that are probably only learned after quite a few knockdowns, which could have serious consequences to a bicycle and rider moving at a good rate on a hard surface. Theoretically such an arrangement could move with the wind abeam, or even against the wind.

A more stable sail-propelled wheel vehicle is proposed in U.S. Pat. No. 3,572,740. This arrangement uses a standard sloop rig and is basically just an iceboat with wheels. The rider sits directly below the sail to get the center of mass of the vehicle as low as possible. Thus this arrangement cures many of the defects of the arrangement discussed immediately above, but is not adaptable to a two-wheeled bicycle at all.

OBJECTS OF THE INVENTION

It is therefore an object of the present invention to provide an improved sail rig for a bicycle.

Another object is the provision of such a sail rig for a bicycle which overcomes the above-given disadvantages, that is which has a low center of effort so as to be easy to control and relatively safe to operate.

SUMMARY OF THE INVENTION

A sail rig according to this invention is used on a standard bicycle having a frame, a saddle on the frame, a front wheel on the frame forward of the saddle, and handlebars on the frame forward of the saddle and connected to the front wheel for pivoting same and steering the bicycle. The sail rig has a sail frame formed of an upright yarn having a center and upper and lower ends and a boom extending generally horizontally rearward from the center, having a rear end spaced horizontally therebehind, and forming with the yard a sail frame. An upright sail spanned over the yard and boom is generally symmetrical to either side of the boom. A fitting secured to the bicycle frame between the saddle and handlebars forms a socket between the saddle and the handlebars and a holddown eye forward of the handlebars. An upright rigid mast secured in the socket has an upper end connected by a swivel joint with the sail frame generally at the yard center. A halyard having upper and lower ends secured to the respective upper and lower ends of the yard is secured between these ends below the boom to the bicycle frame at the holddown eye. Thus the sail can pivot about an axis through the pivot and the holddown eye. A sheet extends from the boom rearward of the swivel joint to a rider on the saddle.

Thus the sail according to this invention, a modified lateen rig, has a relatively low center of effort, generally at the boom near its front end. The sail can be controlled very easily directly by the rider for extreme ease of use. The bicycle can easily move on a reach, with the wind abeam, and can even be changed from one tack to another.

The bicycle of this invention lies generally in an upright plane. The fitting forms another holddown eye forward of the handlebars and the holddown eyes are symmetrically equispaced to opposite sides of the bicycle plane. Thus it is possible to change tack by swinging the sail overhead, pivoting it about its axis of the boom, so that the sail is supported at the other guide eye and the tack is reversed.

The fitting according to this invention includes a spring element extending transverse to the frame between the eyes and permitting limited elastic deflection of same. In addition the halyard is at least partially elastically stretchable between its ends. These features reduce the likelihood of being knocked down by a gust.

The sail frame of the present invention also has at its center a tee having upright arms receiving the yard and a horizontal leg receiving the boom, the swivel being connected directly to the tee. The yard is actually formed of two separate and coaxial upper and lower parts secured in the respective tee arms and defining the respective yard ends. In addition the boom is limitedly displaceable horizontally forward and backward in the tee which is provided with a locking screw for clamping the boom in place in the leg thereof. Thus the sail can be quite taut.

The swivel of this invention is a power joint and the fitting is downwardly U-shaped and fits over the bicycle cross bar. Locking means, in the form of a screw threaded in the fitting and engageable with the cross bar, locks the fitting on the bicycle frame.

A belt worn by the rider in the bicycle saddle is provided with a cleat for securing the sheet to the belt. The boom rear has an eye and the sheet passes through this eye and has one end attached to the belt and another end connected to the cleat means. Thus the rider can control said position both by pulling in and letting out the sheet and by leaning.

DESCRIPTION OF THE DRAWING

The above and other features and advantages will become more readily apparent from the following, reference being made to the accompanying drawing in which:

FIG. 7 is a perspective view with the sail removed of the rigging of the assembly according to the invention;

FIG. 8 is a side view of the halyard assembly; and;

SPECIFIC DESCRIPTION

Figure 1:
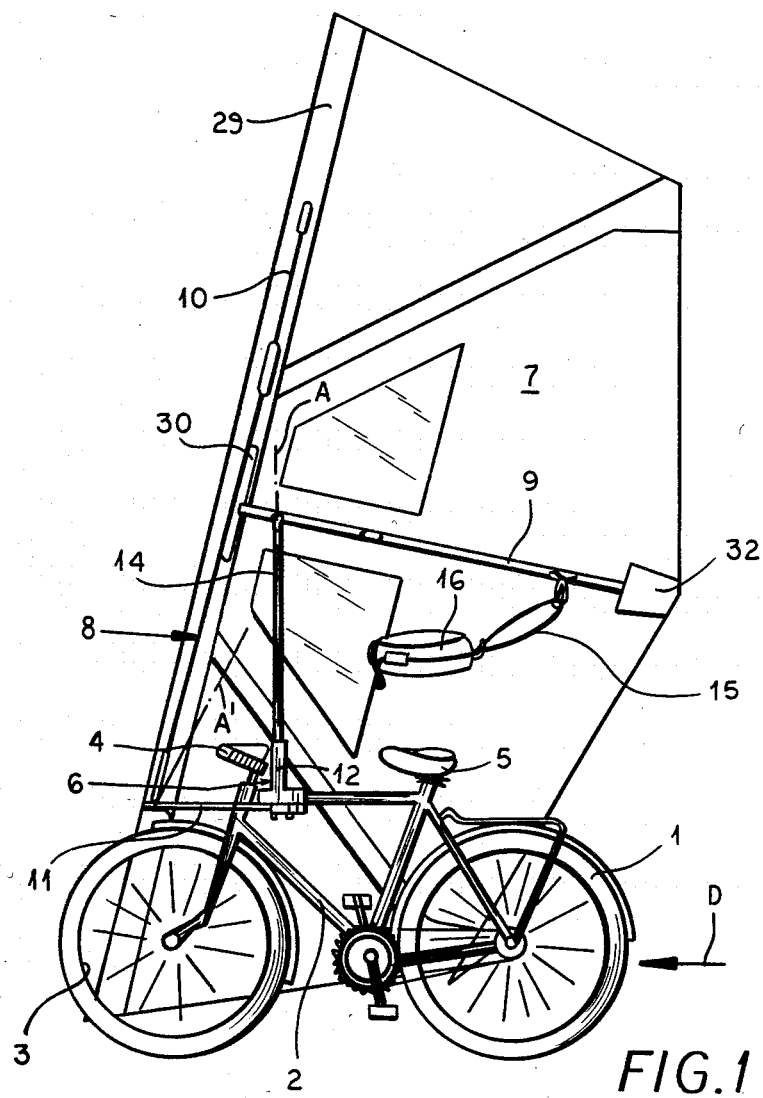
FIG. 1. is a small-scale side view of the sail bicycle according to this invention.
Figure 2:
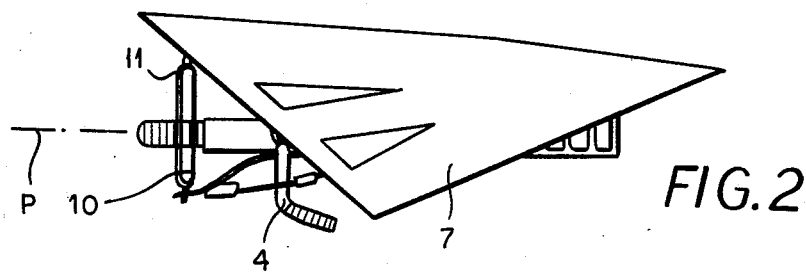
FIG. 2 is a top view of the sail bicycle of FIG. 1.
Figure 3:
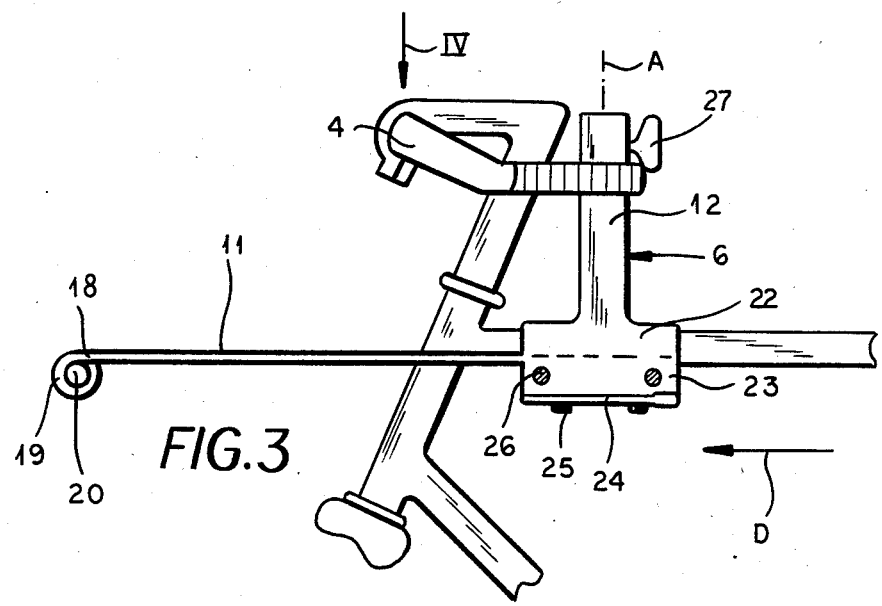
FIG. 3 is a large-scale side view of a detail of FIG. 2.
Figure 4:
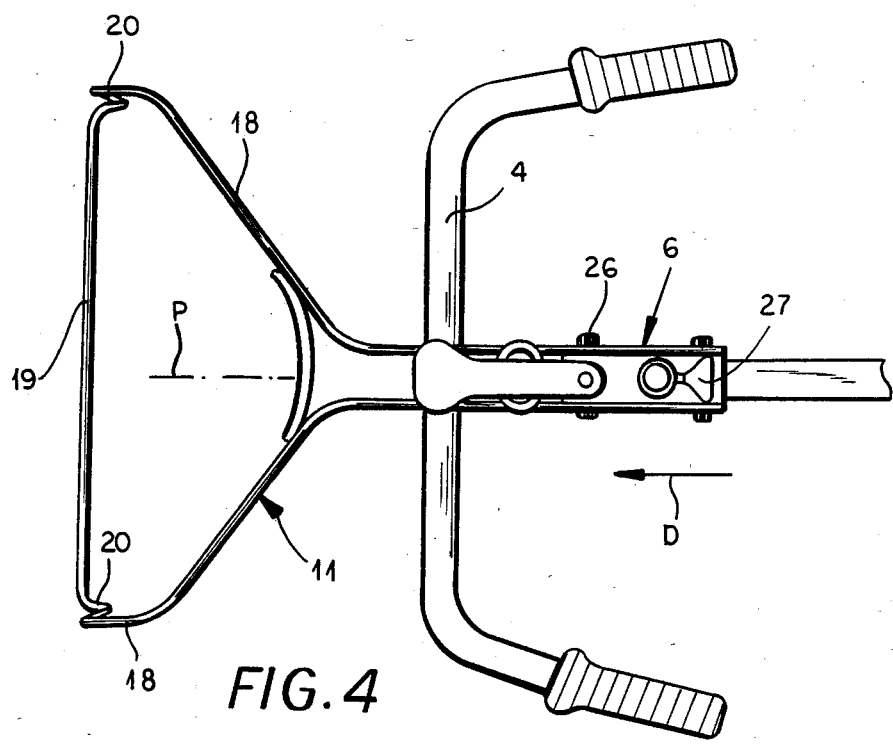
FIG. 4 is a top view taken in the direction of arrow IV of FIG. 3.

As seen in FIG. 1 a standard bicycle has a rear wheel 1, a frame 2 connecting it to a front wheel 3 pivotal about an upright axis by means of handlebars 4. A saddle 5 is provided for the cyclist who holds the handlebars 4. The bicycle lies in and defines an upright plane extending in a normal horizontal travel direction D.

The sail rig according to this invention includes a support fitting 6 that defines on the bicycle an upright axis A for a mast 14 described in more detail below. This fitting 6 is of T-shape and forms an upwardly open socket 12 in which the mast rod 14 can be secured at any of a multiplicity of vertically offset positions centered on the axis A, locked in place by a wing nut 27. The lower part 22 of this fitting 6 is of U-section parallel to the normal bicycle travel direction D and has two sides 23 joined by a threaded bottom block 24 held in place between the sides by bolts 26. Screws 25 are threaded vertically in this block 24 to bear upward on the bicycle's cross bar or so-called top tube to lock the fitting 6 solidly in place. It is also within the scope of this invention to provide rod extensions for the sides 23 of the fitting part 22, to lock the fitting in place on the down tube of the frame 2 also.

Figure 5:
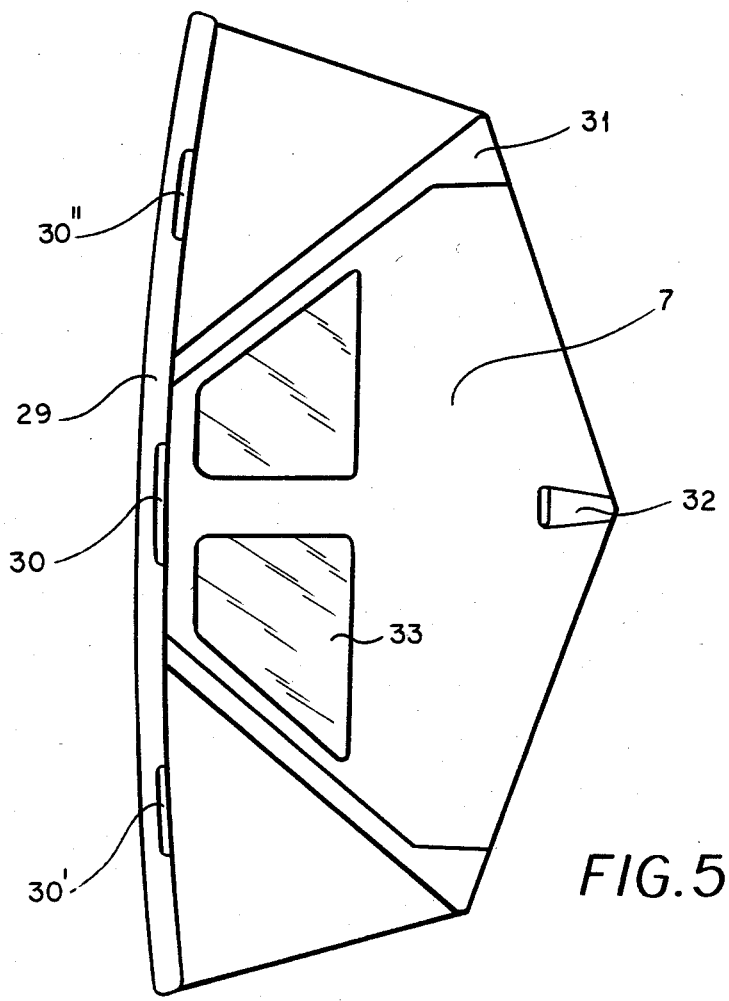
FIG. 5 is a side view of the sail for the bicycle of the invention.
Figure 6:
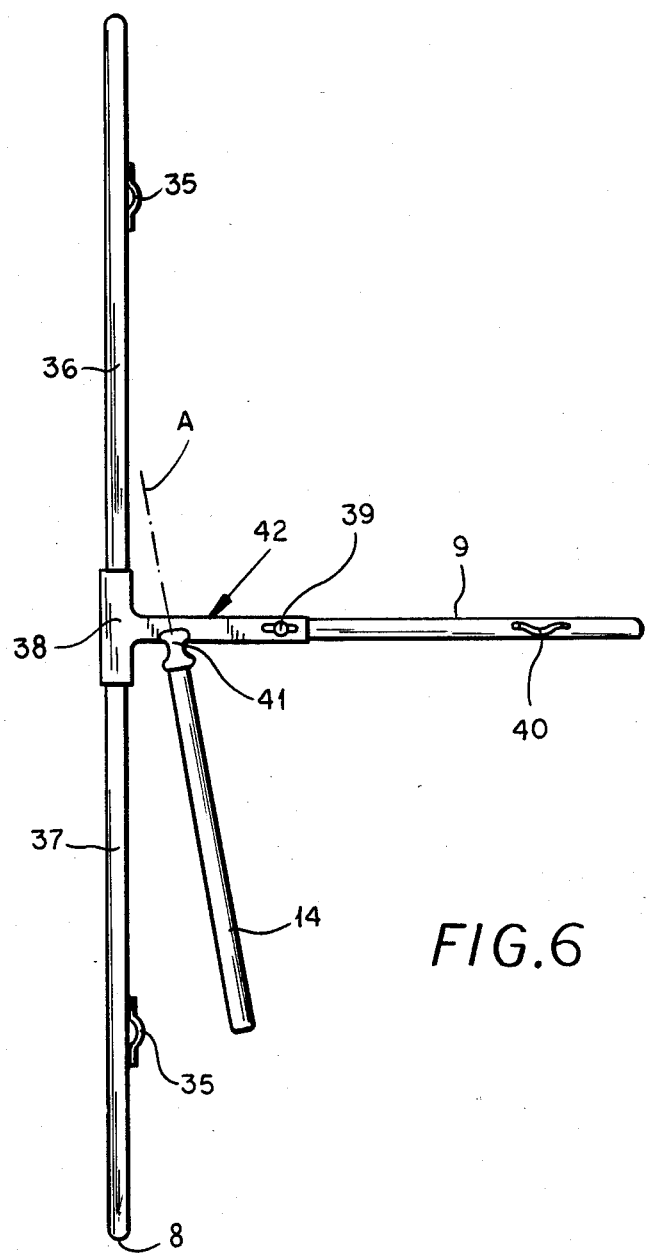
FIG. 6 is a side view of the sail-frame and mast assembly according to the invention.
Figure 9:
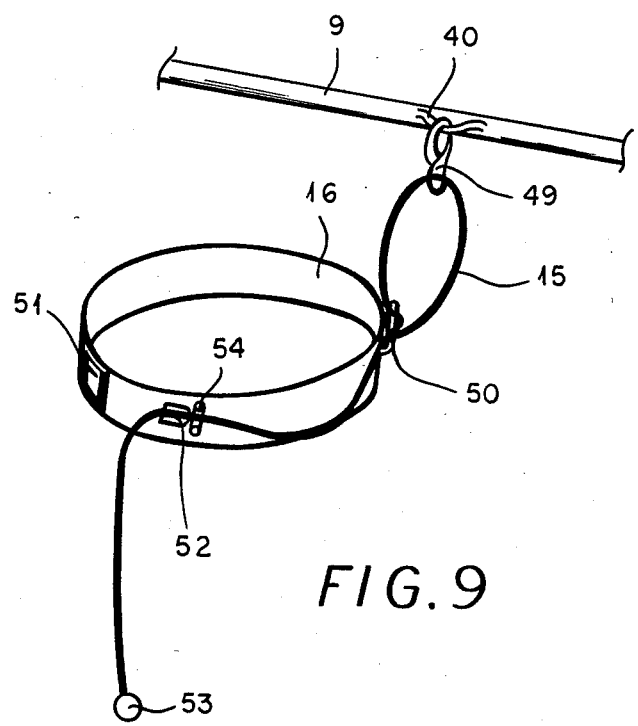
FIG. 9 is a perspective view of the belt assembly.

As also shown in FIG. 7, the sail 7 is carried on a frame comprising a fore-edge yard 8 and a boom 9 that itself is connected by a universal or swiveled joint 41 on the upper end of the mast 14. The sail 7 is symmetrical as seen in FIG. 5 also at the boom 9 and has a fore edge formed with a straight pocket 29 receiving the yard 8 and formed with three openings 30, 30', and 30" into the pocket 29. At its clew the sail 7 has a pocket 32 receiving the rear end of the boom 9. Battens 31 extend the sides of the sail 7 to give it a symmetrical basically pentagonal shape for maximum area. Transparent windows 33 allow the rider sitting on the saddle 5 to see through the sail 7.

The yard 8 is formed of two pieces 36 and 37 of aluminum tubing received in the T-arm section 38 of a tee 42 whose center leg projects from the opening 30 of the pocket 29 and receives the front end of the boom 9. A wing nut 39 threaded in this fitting 42 allows the boom 9 to be locked in place therein, normally with the sail 7 taut. Thus the entire assembly can be dismantled and reduced to a relatively small package.

The swivel 41 is a so-called power joint which comprises an elastomeric block having two threaded pin extensions which can move relative to each other and which are respectively screwed into the fitting 38 and mast 14. A collar-type joint surrounding the fitting 38 could also be provided to permit pivoting the sail 7, fitting 38, and yard 8 about the axis of the boom 9. Thus the sail frame 8, 9 is suspended from the joint 41 but is not restrained by this joint 41 from any degree of movement except displacement of its center with respect to the bicycle.

The lower front end of the sail 7 is held down by a halyard-type rig shown in FIG. 8 to a yoke guide 11 having legs 18 secured to the sides 23 of the fitting 6 and bridged by a springy bight portion 19 between eyes 20 equispaced from the plane P of the bicycle. The yard 8 is provided slightly inward of its outer ends with eyes 35 for respective snap hooks 47 and 47' at the end of short cables 10 joined by connector tubes 45 and 46 to the ends of a piece of shock cord 44. These cables 10 have, between their snap hooks 47 and 47' and connectors 45 and 46, a length equal to the distance between the eyes 20. Thus the sail can be seated with its one eye hook 47 engaging the one eye 20 on the left side of the bicycle or the other hook 47' engaging the other eye 20 on the right side of the bicycle. In either position the guide 11 will secure the lower portion of the sail 7 so that in actuality the sail 7 will only be able to move pivotally about an axis A' passing through whichever eye 20 is at the respective eye 35 and the pivot joint 41. Obviously tack can be reversed by switching the sail 7 from one side of the bicycle plane P to the other.

Pivoting about this axis A' is controlled by a sheet 15 that passes through another snap hook 49 engaged in a sheet eye 40 provided on the boom 9. One end of this sheet 15 is secured in a mid-back eye 50 on a belt 16 worn by the bicyclist and having a front buckle 51. The other end of this sheet 15 passes through a left-side eye 54 in the belt 16 and then through a simple jam cleat 52, terminating in a ball 53. Thus the rider can set tack by changing body position without uncleating the sheet 15 or by pulling in or letting out this sheet 15 by adjusting the ball 53. With steady wind conditions the rider can pilot the sail bicycle simply by shifting in his or her seat.

The swivel 41 is connected to the frame 8, 9 at such a location that approximately one-third of the sail force lies between the yard spar 8 and the swivel 41. Thus it is relatively easy for the rider to control the sail with relatively little force.

I claim:

1. In combination with a bicycle having
   a frame;
   a saddle on the frame;
   a front wheel on the frame forward of the saddle; and
   handlebars on the frame and forward of the saddle, the handlebars being connected to the front wheel for pivoting same and steering the bicycle; a sail rig comprising:
   an upright yard having a center and upper and lower ends;
   a boom extending generally horizontally rearward from the center, having a rear end spaced horizontally therebehind, and forming with the yard a sail frame;
   an upright sail spanned over the yard and boom and generally symmetrical to either side of the boom;
   a fitting secured to the bicycle frame between the saddle and handlebars and forming a socket between the saddle and the handlebars and a holddown eye forward of the handlebars;
   an upright rigid mast secured in the socket and having an upper end;
   a swivel joint connecting the mast upper end with the sail frame generally at the yard center;
   a halyard having upper and lower ends secured to the respective upper and lower ends of the yard and secured therebetween below the boom to the bicycle frame at the holddown eye, whereby the sail can pivot about an imaginary line through the swivel joint and the holddown eye; and
   a sheet extending from the boom rearward of the swivel joint to a rider on the saddle.

2. The bicycle sail rig defined in claim 1 wherein the bicycle lies generally in an upright plane, the fitting forming another holddown eye forward of the handlebars, the holddown eyes being equispaced to opposite sides of the bicycle plane.

3. The bicycle said rig defined in claim 3 wherein the fitting includes a spring element extending transverse to the frame between the eyes and permitting limited elastic deflection of the same.

4. The bicycle sail rig defined in claim 1 wherein the sail frame also has at the center a tee having upright arms receiving the yard and a horizontal leg receiving the boom, the swivel being connected directly to the tee.

5. The bicycle said rig defined in claim 4 wherein the yard has separate and coaxial upper and lower part secured in the respective tee arms and defining the respective yard ends.

6. The bicycle sail rig defined in claim 4 wherein the boom is limitedly displaceable horizontally forward and backward in the tee, the tee being provided with a locking screw for clamping the boom in place in the leg thereof.

7. The bicycle sail rig defined in claim 1 wherein the swivel is a power joint.

8. The bicycle sail rig defined in claim 1 wherein the halyard is at least partially elastically stretchable between its ends.

9. The bicycle sail rig defined in claim 1 wherein the fitting is downwardly U-shaped and the bicycle has a cross bar over which this fitting fits, the fitting being provided with locking means for clamping itself to the cross bar.

10. The bicycle sail rig defined in claim 1, further comprising
    a belt to be worn by the rider in the bicycle saddle and provided with cleat means for securing the sheet to the belt.

11. The bicycle sail rig defined in claim 10 wherein the boom rear end has an eye and the sheet passes through this eye and has one end attached to the belt and another end connected to the cleat means.

* * * * *